(12) United States Patent
Braithwaite et al.

(10) Patent No.: US 8,876,931 B2
(45) Date of Patent: Nov. 4, 2014

(54) FILTER ASSEMBLY

(75) Inventors: Alexander Braithwaite, Climax, MI (US); Michael Desjardins, Kalamazoo, MI (US); Joshua J. Barron, Mt Holly, NC (US)

(73) Assignee: Mann+Hummel GmbH, Ludwigsburg (DE)

( * ) Notice: Subject to any disclaimer, the term of this patent is extended or adjusted under 35 U.S.C. 154(b) by 159 days.

(21) Appl. No.: 13/342,485

(22) Filed: Jan. 3, 2012

(65) Prior Publication Data

US 2013/0167490 A1    Jul. 4, 2013

(51) Int. Cl.
*G01B 5/06* (2006.01)

(52) U.S. Cl.
USPC ............. 55/309; 55/350.1; 55/385.3; 55/486; 210/232; 210/259; 210/547.1; 210/650

(58) Field of Classification Search
CPC .................................................... B01D 46/2411
USPC ............. 55/309, 350.1, 385.3, 486, DIG. 30; 123/198 E; 210/650, 232, 547.1, 259
See application file for complete search history.

(56) References Cited

U.S. PATENT DOCUMENTS

| | | | |
|---|---|---|---|
| 5,725,777 A * | 3/1998 | Taylor | 210/650 |
| 2007/0130896 A1* | 6/2007 | Walz et al. | 55/486 |
| 2009/0272361 A1* | 11/2009 | Buelow et al. | 123/198 E |
| 2010/0275558 A1* | 11/2010 | Amesoeder | 55/309 |

* cited by examiner

*Primary Examiner* — Jason M Greene
*Assistant Examiner* — Karla Hawkins
(74) *Attorney, Agent, or Firm* — James Hasselbeck

(57) ABSTRACT

A filter assembly may include a housing, a filter element, and a layer of air-permeable material. The housing may include an inlet and an outlet. The filter element may be disposed within the housing and may include an upstream face, a downstream face, a first end face facing the inlet and extending between the upstream and downstream faces. The layer of air-permeable material may be attached to the filter element and may cover the upstream face and a portion of the first end face that is exposed to the inlet.

20 Claims, 3 Drawing Sheets

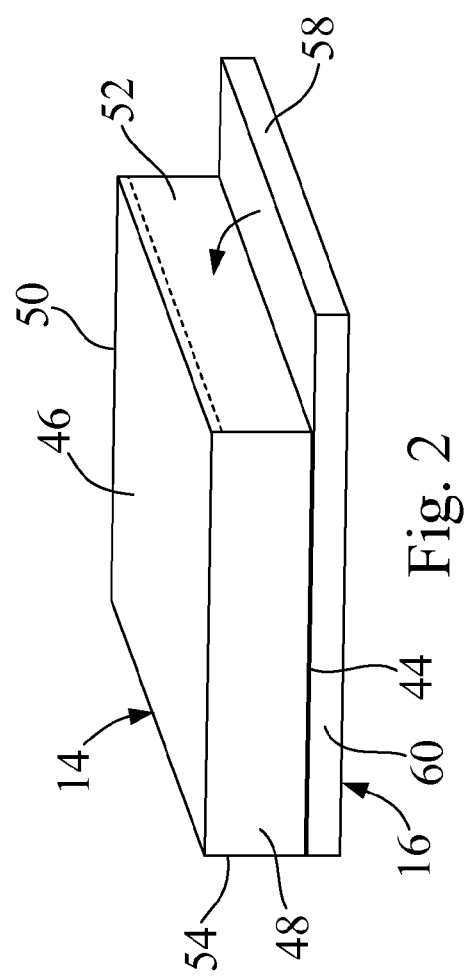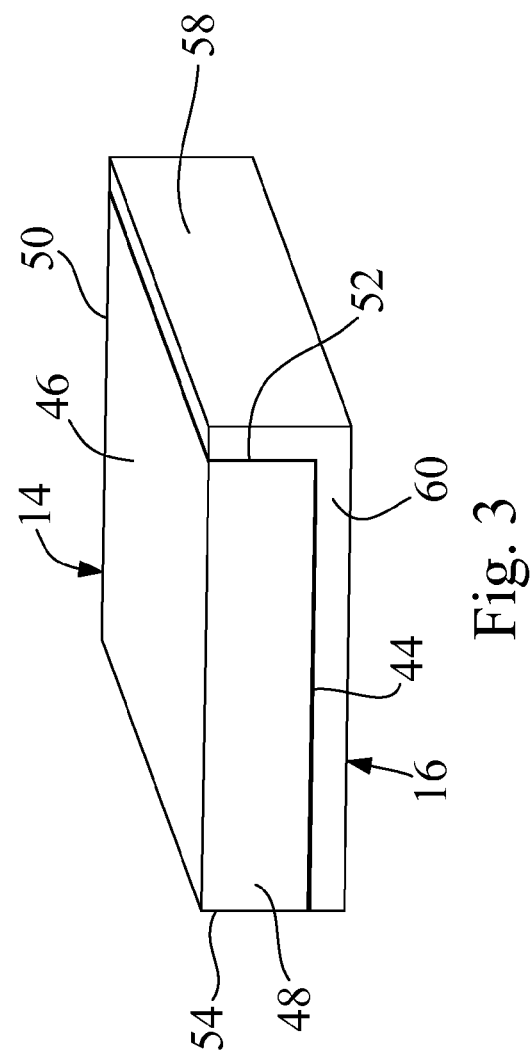

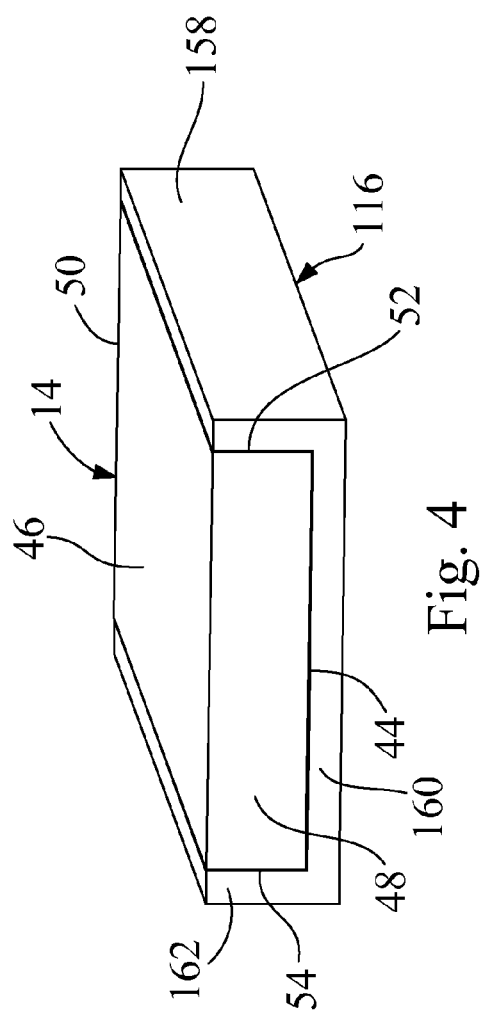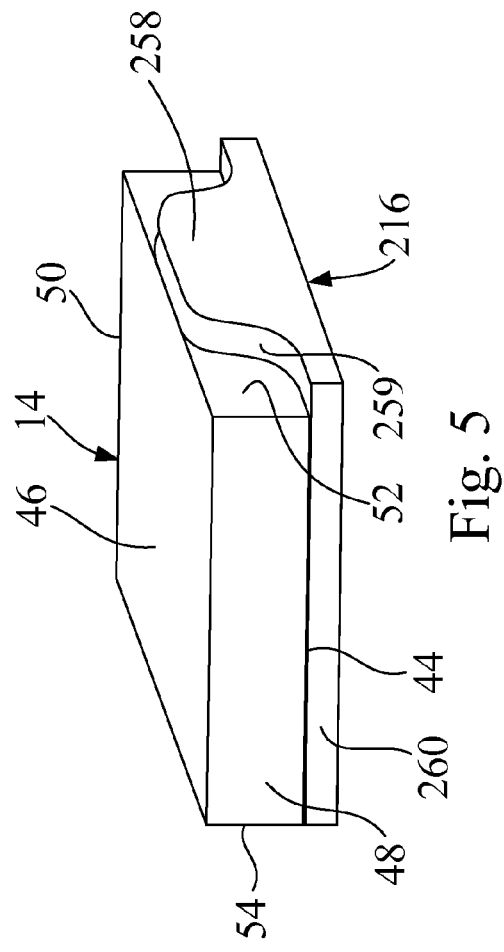

FILTER ASSEMBLY

FIELD

The present disclosure relates to a filter assembly, and more particularly to an air filter assembly including a pre-filter.

BACKGROUND

This section provides background information related to the present disclosure and is not necessarily prior art.

Internal combustion engines include an air-induction system that draws air from a surrounding environment for combustion within the engine. Typically, a filter assembly is incorporated into the air-induction system. The filter assembly may remove dust, dirt, debris, liquids, and/or other impurities from the air before the air is drawn into the engine for combustion. Efficient and reliable performance of the filter assembly contributes to efficient and reliable performance of the engine.

SUMMARY

This section provides a general summary of the disclosure, and is not a comprehensive disclosure of its full scope or all of its features.

In one form, the present disclosure provides a filter assembly that may include a housing, a filter element, and a layer of air-permeable material. The housing may include an inlet and an outlet. The filter element may be disposed within the housing and may include an upstream face, a downstream face, and a first end face facing the inlet and extending between the upstream and downstream faces. The layer of air-permeable material may be attached to the filter element and may cover the upstream face and a portion of the first end face that is exposed to the inlet.

In another form, the present disclosure provides a filter assembly that may include a housing, a filter element, and a fleece material. The housing may include a first shell portion defining an inlet and a second shell portion defining an outlet. The filter element may be disposed within the housing and may include an upstream face, a downstream face, and a first end face facing the inlet and extending between the upstream and downstream faces. The upstream face may cooperate with the first shell portion to define a plenum upstream of the filter element. The fleece material may include a first portion at least partially covering the upstream face and a second portion at least partially covering the first end face.

In yet another form, the present disclosure provides a filter assembly that may include a housing, a filter element, and a pre-filter element. The housing may include an inlet and an outlet. The filter element may be disposed within the housing and may include an upstream side, a downstream side, a first end facing the inlet and extending between the upstream and downstream sides. The pre-filter element may be disposed outside of the filter element and may include a first portion disposed between the upstream side and the housing and a second portion disposed between the first end and the inlet.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 2 is a perspective view of a filter element and the pre-filter element partially attached to the filter element;

FIG. 3 is a perspective view of the filter element of FIG. 2 with the pre-filter element attached thereto according to the principles of the present disclosure;

FIG. 4 is a perspective view of the filter element having another pre-filter element attached thereto according to the principles of the present disclosure; and FIG. 5 is a perspective view of the filter element having yet another pre-filter element attached thereto according to the principles of the present disclosure.

Corresponding reference numerals indicate corresponding parts throughout the several views of the drawings.

DETAILED DESCRIPTION

Figure 1:
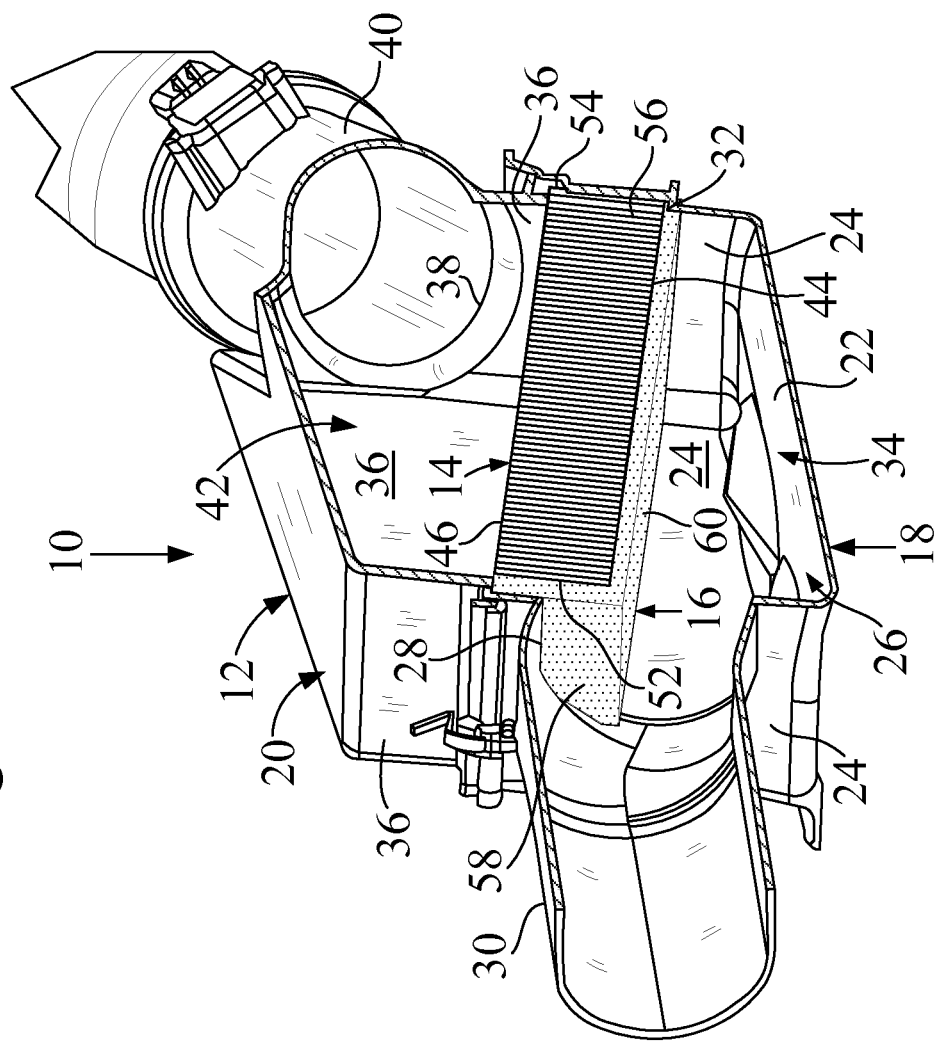
FIG. 1 is a cross-sectional perspective view of a filter assembly including a pre-filter element according to the principles of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms.

These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIGS. 1-3, a filter assembly 10 is provided that may include a housing 12, a filter element 14, and a pre-filter element 16. The filter assembly 10 may be disposed in an air-induction tract (not shown) of an internal combustion engine (not shown), for example. The filter assembly 10 may be operable to remove dirt and/or other impurities from air flowing through the air-induction tract prior to the air being inducted into the engine. While the filter assembly 10 is described above as being incorporated into an air-induction tract for an internal combustion engine, it will be appreciated that the filter assembly 10 could be incorporated into any other device or system to remove dirt, liquid, debris and/or other impurities from a gaseous fluid.

The housing 12 may include a first shell portion 18 and a second shell portion 20 that may be removably connected to each other. The first shell portion 18 may include a base 22 and a plurality of walls 24 defining a cavity 26. An inlet 28 may be formed in one of the walls 24 to provide fluid communication between an air-inlet conduit 30 and the cavity 26. One or more of the walls 24 may include a mounting flange 32 adapted to support the filter element 14 and the pre-filter element 16 such that the filter element 14 and the pre-filter element 16 are spaced apart from the base 22. In this manner, the pre-filter element 16 may cooperate with the base 22 to define a first plenum 34 therebetween that receives unfiltered air from the air-inlet conduit 30 and inlet 28.

The second shell portion 20 may include a plurality of walls 36, one of which may include an outlet 38 in fluid communication with an air-outlet conduit 40. The walls 36 may cooperate with the filter element 14 to define a second plenum 42. The air-outlet conduit 40 may receive filtered air from the second plenum 42 through the outlet 38.

The filter element 14 may include an upstream face or side 44, a downstream face or side 46, a first lateral side 48, a second lateral side 50, a first end face 52, and a second end face 54. The upstream side 44 may be generally rectangular and may abut the pre-filter element 16, as will be subsequently described. The downstream side 46 may be generally rectangular and may be disposed substantially parallel to the upstream side 44. The downstream side 46 may partially define the second plenum 42.

The first and second lateral sides 48, 50 may be substantially rectangular and may be substantially parallel to each other. The first and second lateral sides 48, 50 may extend between the first and second end faces 52, 54 and between the upstream and downstream sides 44, 46 and may be substantially perpendicular to the first and second end faces 52, 54 and the upstream and downstream sides 44, 46. The first and second lateral sides 48, 50 may abut respective opposing walls 24 of the first shell portion 18 of the housing 12.

The first end face 52 may be substantially rectangular and may extend between the upstream and downstream sides 44, 46 in a direction that is substantially perpendicular to the first and second lateral sides 48, 50 and the upstream and downstream sides 44, 46. The first end face 52 may face the inlet 28 and at least a portion of the first end face 52 may be aligned with and exposed to the inlet 28 such that at least a portion of air entering the first shell portion 18 through the inlet 28 may flow through the first end face 52 and into the second plenum 42 without flowing through the upstream side 44. At least the portion of the first end face 52 aligned with and exposed to the inlet 28 may abut the pre-filter element 16, as will be subsequently described.

The second end face 54 may be substantially rectangular and may extend between the upstream and downstream sides 44, 46 in a direction that is substantially parallel to the first end face 52 and perpendicular to the first and second lateral sides 48, 50. The second end face 54 may abut the wall 24 opposite the inlet 28.

In the embodiment illustrated, the filter element 14 may include a bellows construction having a plurality of pleats 56 formed from a paper, a synthetic fiber, and/or a cellulose fiber material, for example. Tips or edges of the pleats 56 may define the upstream and downstream sides 44, 46, the first and second lateral sides 48, 50, and the first and second end faces 52, 54. The pleats 56 may extend longitudinally between the upstream and downstream sides 44, 46. In other embodiments, the filter element 14 could be any other type of filter having any suitable construction or configuration. In some embodiments, the filter element 14 may include one or more support ribs or bands (not shown) to support and restrict or prevent deflection of the filter element 14 during operation of the filter assembly.

The pre-filter element 16 be formed from a fleece material and may include a first portion 58 and a second portion 60. The fleece material may include polyester, polyamide (nylon), polyethylene, polypropylene, polycarbonate, polystyrene polyacrylonitrile, acrylonitrile-butadiene-styrene copolymer (ABS), and/or one or more other polymeric fibers, or one or more nonwoven materials, for example. The first portion 58 may abut and substantially cover some or all of the first end face 52 of the filter element 14. In this manner, the first portion 58 may be disposed between the first end face 52 and the inlet 28 of the housing and may be in contact with the first end face 52 and the wall 24 in which the inlet 28 is formed. The second portion 60 may abut and substantially cover some or all of the upstream side 44 of the filter element 14. In this manner, the second portion 60 may be disposed between the base 22 of the first shell portion 18 of the housing 12 and may partially define the first plenum 34. In some embodiments, the first and second portions 58, 60 may be adhesively bonded and/or otherwise suitably attached to the first end face 52 and the upstream side 44, respectively.

The fleece material of the pre-filter element 16 may include water repellant and/or water-draining properties that restrict or prevent water or moisture entering the housing 12 from soaking or becoming entrained in the filter element 14 or passing the housing 12 through the outlet 38. The fleece material may also be sufficiently air-permeable to allow air to pass therethrough while also filtering and retaining dirt and other impurities from the air. In some embodiments, the fleece material of the pre-filter element 16 may be more or less air-permeable than the one or more materials forming the filter element 14.

In some embodiments, the first and second portions 58, 60 may be integrally formed with each other to form a single, continuous layer, while in other embodiments, the first and second portions 58, 60 may be discrete sheets or layers. In some embodiments, the pre-filter element 16 does not cover any of the downstream side 46, the first lateral side 48, or the second lateral side 50 of the filter element 14. In some embodiments, the pre-filter element 16 does not cover any of the second end face 54 of the filter element 14.

With continued reference to FIGS. 1-3, operation of the filter assembly 10 will be described in detail. As described above, the filter assembly 10 may be disposed in an air-induction tract of an internal combustion engine and may be operable to remove dirt, debris, liquids, and/or other impurities from air flowing through the air-induction tract prior to the air being drawn into a combustion chamber of the engine.

Dirty air may enter the housing 12 through the air-inlet conduit 30 and the inlet 28. A first portion of the dirty air flowing through the inlet 28 may flow around the first portion 58 of the pre-filter element 16 and the first end face 52 of the filter element 14 and directly into the first plenum 34. The dirty air in the first plenum 34 may then flow through the second portion 60 of the pre-filter element 16, through the upstream side 44 of the filter element 14, out of the filter element 14 through the downstream side 46 and into the second plenum 42 as relatively clean air.

A second portion of dirty air entering the housing 12 through the inlet 28 may flow directly through the first portion 58 of the pre-filter element 16 and through the first end face 52 of the filter element 14, bypassing the first plenum 34, the second portion 60, and the upstream side 44. From the first end face 52, the air may flow diagonally through one or more of the pleats 56, out of the downstream side 46 and into the second plenum 42 as relatively clean air. The clean air in the second plenum 42 may exit the housing 12 through the outlet 38 and may subsequently flow to the engine, for example, for combustion therein.

The first portion 58 of the pre-filter element 16 covering at least the portion of the first end face 52 that is exposed to the inlet 28 may restrict or prevent water or moisture from wetting the filter element 14, thereby improving the performance of the filter element 14. The first portion 58 may also improve the dirt-holding capacity of the filter assembly 10, and may divert some air into the first plenum 34 without causing unacceptable pressure loss.

Referring now to FIG. 4, another pre-filter element 116 is provided that may be incorporated into the filter assembly 10. The structure and function of the pre-filter element 116 may be substantially similar to that of the pre-filter element 16 described above, apart from any exceptions noted below or shown in the figures.

The pre-filter element 116 may include a first portion 158, a second portion 160, and a third portion 162. In some embodiments, the first, second and third portions 158, 160, 162 may be integrally formed as a single, continuous fleece layer, while in other embodiments, the first, second and third portions 158, 160, 162 may be discrete pieces. The first portion 158 may substantially cover at least a portion of the first end face 52 of the filter element 14. The second portion 160 may substantially cover at least a portion of the upstream side 44. The third portion 162 may substantially cover at least a portion of the second end face 54 such that the third portion 162 is disposed between the second end face 54 and the wall 24 facing the second end face 54. This arrangement facilitates poka-yoke assembly. That is, a user may install the filter element 14 and pre-filter element 16 with either the first portion 158 and first end face 52 facing the inlet 28 or with the third portion 162 and the second end face 54 facing the inlet 28 without affecting the operation or performance of the filter assembly 10.

Referring now to FIG. 5, another pre-filter element 216 is provided that may be incorporated into the filter assembly 10. The structure and function of the pre-filter element 216 may be substantially similar to that of the pre-filter element 16, 116 described above, apart from any exceptions noted below or shown in the figures.

The pre-filter element 216 may include a first portion 258 and a second portion 260. The second portion 260 may substantially cover at least a portion of the upstream side 44 of the filter element 14. The first portion 258 may be curved to include a profile 259 that corresponds to the cross-sectional shape of the inlet 28. That is, the profile 259 is shaped so that portions of the first end face 52 that are not aligned with the inlet 28 may not be covered by the first portion 258. This configuration may reduce the amount of the fleece material needed to manufacture the pre-filter element 216, thereby reducing material costs of the pre-filter element 216.

It will be appreciated that in some embodiments, the pre-filter element 216 could include a third portion (not shown) having a profile similar to the profile 259 covering a portion of the second end face 54.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:
1. A filter assembly comprising:
   a housing having an inlet for fluid to be filtered and an outlet for filtered fluid;
   a filter element disposed within the housing and including
      an upstream face receiving and filtering a first portion of the fluid to be filtered,
      a downstream face through which filtered fluid leaves the filter element, the downstream face disposed substantially parallel to the upstream face,
      a first end face facing the inlet and extending in a direction substantially perpendicular to the upstream face and downstream face, the first end face extending from the upstream face to the downstream face, the first end face receiving and filtering a second portion of the fluid to be filtered; and
   a layer of air-permeable material attached to the filter element and covering the upstream face and a portion of the first end face at an area that is facing and aligned with the inlet;
   the layer of air-permeable material includes:
      a first portion of the air-permeable material covering the upstream face of the filter element to filter the first portion of the fluid to be filtered before it reaches the upstream face;
      a second portion of the air-permeable material covering the portion of the first end face of the filter element to filter the second portion of the fluid to be filtered before it reaches the first end face.

2. The filter assembly of claim 1, wherein the air-permeable material includes a fleece material.

3. The filter assembly of claim 1, wherein the filter element includes a second end face extending between the upstream and downstream faces and facing away from the inlet, the second end face being substantially parallel to the first end face, and wherein at least a portion of the second end face is substantially covered with the layer of air-permeable material.

4. The filter assembly of claim 1, wherein the downstream face is not covered with the layer of air-permeable material.

5. The filter assembly of claim 1, wherein the layer of air-permeable material is more permeable than the filter element.

6. The filter assembly of claim 1, wherein the first and second portions of the layer of air-permeable material cooperate to form a single, continuous layer of the air-permeable material.

7. A filter assembly comprising:
a housing including a first shell portion defining an inlet for fluid to be filtered and a second shell portion defining an outlet for filtered fluid;
a filter element disposed within the housing and including
an upstream face receiving and filtering a first portion of the fluid to be filtered,
a downstream face through which filtered fluid leaves the filter element, the downstream face disposed substantially parallel to the upstream face,
a first end face facing the inlet and extending in a direction substantially perpendicular to the upstream face and downstream face, the first end face extending from the upstream face to the downstream face, the first end face receiving and filtering a second portion of the fluid to be filtered, the upstream face cooperating with the first shell portion to define a plenum upstream of the filter element; and
a fleece material including
a first portion of the fleece material at least partially covering the upstream face to filter the first portion of the fluid to be filtered before it reaches the upstream face; and
a second portion of the fleece material at least partially covering the first end face of the filter element at an area that is facing and aligned with the inlet, the second portion of fleece material filtering a portion of the second portion of the fluid to be filtered before it reaches the first end face.

8. The filter assembly of claim 7, wherein the first and second portions of the fleece material cooperate to form a single, continuous layer of the fleece material.

9. The filter assembly of claim 7, wherein the filter element has a first permeability value and the fleece material has a second permeability value that is greater than the first permeability value.

10. The filter assembly of claim 7, wherein the first portion of the fluid to be filtered entering the first shell portion through the inlet flows through the first portion of the fleece material and through the first end face and bypasses the second portion of the fleece material.

11. The filter assembly of claim 10, wherein the second portion of the fluid to be filtered entering the first shell portion through the inlet flows into the plenum and through the second portion of the fleece material and bypasses the first portion of the fleece material.

12. The filter assembly of claim 7, wherein the filter element includes a second end face extending between the upstream and downstream faces and facing away from the inlet, and wherein at least a portion of the second end face is substantially covered with the fleece material.

13. The filter assembly of claim 12, wherein the filter element includes opposing first and second side faces extending between the first and second end faces and between the upstream and downstream faces, and wherein the first and second side faces are not covered with the fleece material.

14. The filter assembly of claim 7, wherein the downstream face is not covered with the fleece material.

15. A filter assembly comprising:
a housing including an inlet for fluid to be filtered and an outlet for filtered fluid;
a filter element disposed within the housing and including
an upstream side receiving and filtering a first portion of the fluid to be filtered,
a downstream side through which filtered fluid leaves the filter element, the downstream side and disposed substantially parallel to the upstream side,
a first end facing the inlet and extending in a direction substantially perpendicular to the upstream side and downstream side, the first end face extending from the upstream side to the downstream side, the first end face receiving and filtering a second portion of the fluid to be filtered; and
a pre-filter element disposed outside of the filter element and including
a first portion disposed between the upstream side and the housing and
a second portion disposed between the first end and the inlet.

16. The filter assembly of claim 15, wherein the pre-filter element includes a fleece material.

17. The filter assembly of claim 15, wherein the filter element includes a second end opposing the first end and extending between the upstream and downstream sides, and wherein a third portion of the pre-filter element is disposed between the second end and a wall of the housing.

18. The filter assembly of claim 15, wherein the second portion of the fluid to be filtered entering the housing through the inlet flows through the second portion of the pre-filter element and through the first end face and bypasses the upstream side of the filter element.

19. The filter assembly of claim 18, wherein a second portion of the fluid to be filtered entering the housing through the inlet flows through the first portion of the pre-filter element and the upstream side of the filter element and bypasses the first end.

20. The filter assembly of claim 15, wherein the filter element includes a second end face and first and second lateral sides,
the second end face extending between the upstream and downstream faces and facing away from the inlet,
the first and second lateral sides extending between the first and second end faces, and
wherein the second end face and the first and second lateral sides are substantially uncovered by the pre-filter element.

* * * * *